United States Patent [19]

Peoples

[11] 4,354,625
[45] Oct. 19, 1982

[54] CAR TOP CARRIER
[75] Inventor: Charles B. Peoples, Scottsdale, Ariz.
[73] Assignee: U-Haul International, Inc., Phoenix, Ariz.
[21] Appl. No.: 251,265
[22] Filed: Apr. 6, 1981
[51] Int. Cl.³ .............................................. B60R 9/00
[52] U.S. Cl. .................................. 224/329; 224/325; 224/327
[58] Field of Search ............... 224/329, 318, 320, 321, 224/325, 309, 327

[56] References Cited
U.S. PATENT DOCUMENTS

| | | | |
|---|---|---|---|
| 2,480,353 | 8/1949 | Bjork | 224/329 X |
| 2,764,381 | 9/1956 | Anderson | 224/329 X |
| 3,339,813 | 9/1967 | Barenyi | 224/329 X |
| 3,902,641 | 9/1975 | Peasley | 224/318 |
| 4,007,862 | 2/1977 | Heftmann | 224/329 |

Primary Examiner—Steven M. Pollard
Attorney, Agent, or Firm—Cahill, Sutton & Thomas

[57] ABSTRACT

A universal car top carrier is supported upon a pair of spaced apart full length resilient mounting pads. The mounting pads are internally supported by a spring bar to accommodate flexing and produce an even distribution of pressure along the length of the mounting pad. The mounting pads are triangular in cross-section to define three elongated faces each face being differently contoured and selectable to obtain a mating conformance with the supporting roof line or corner. Different width roofs are accommodated by a pair of width adjustable telescoping tubing/support attached to the mounting pads through castings. A cam lock buckle at each casting releasably secures the strap of a gutter hook to lock the car top carrier to the car roof.

16 Claims, 3 Drawing Figures

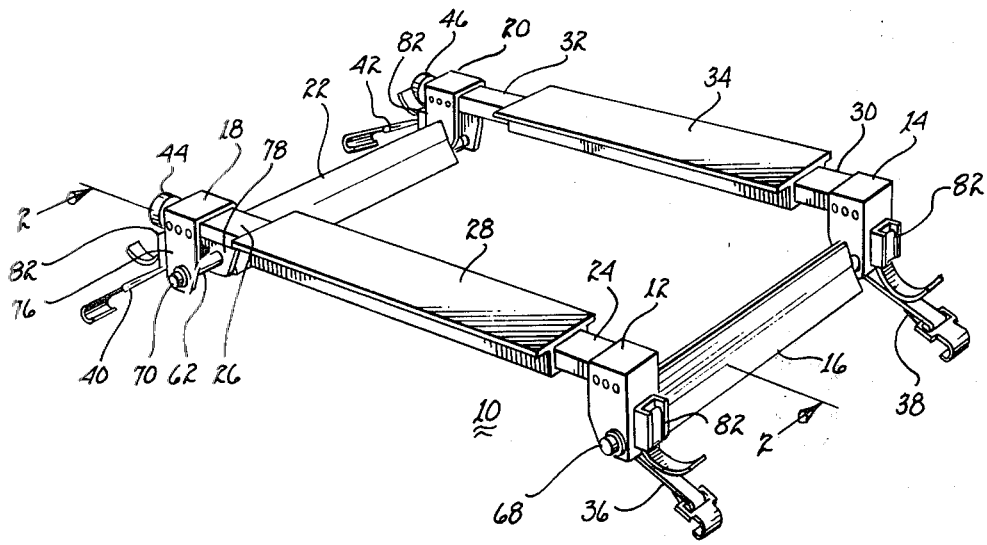

CAR TOP CARRIER

The present invention is related to car top carriers and, more particularly, to a car top carrier adaptable to differently configured car roofs.

Car top carriers of various sorts have been used for a number of years to increase the load carrying capability of hardtop coupes and sedans. Generally, these car top carriers include four circular suction cups which rest upon the car top and support a framework for receiving luggage, boxes, etc. Retaining means for maintaining the carrier upon the roof usually include tension adjustable hook devices for engaging the roof gutter.

The prior art car top carriers suffer from one or more structural, operational or maintainability defects. The mounting pads interfacing with the car top roof are relatively small in collective area. The small area results in concentrations of roof pressures which limit the load carrying capability if a margin against permanent damage to the roof is sought to be maintained. Poorly fitting or non contoured mounting pads result in uneven pressure distributions upon the area of support, and often the resulting pressure causes denting. For those devices having mounting pads specifically contoured to mate with a particular roof area, exact placement of the carrier upon the roof is usually critical; this criticality demands excessive attention by a user in order to achieve the best results obtainable.

The tie down arrangement used in prior art carriers leaves much to be desired in that scratching of the paint upon the gutter often occurs. Where pads are attached to the hooks, scratch-free operation is only possible during the limited life of such pads due to wear or separation.

The width adjustment of most car top carriers must generally be performed by repetitive steps of mounting-/adjustment/mounting, etc. This procedure is awkward and tiresome; the frequent mounting and dismounting increases the probability of scratching the painted areas of the vehicle. Moreover, the tightening of straps or other mechanisms for securing a gutter hook usually requires brute force to place the hook in tension; many persons are physically incapable of exerting sufficient brute force to ensure positive and continuing mounting of the car top carrier during operation of the vehicle.

The car top carrier described herebelow includes a pair of mounting pads which are laterally and longitudinally conformable with an underlying roof surface to distribute the load uniformly across a large surface area and preclude pressure concentrations. This result is achieved by employing a pair of mounting pads, each having a plurality of selectable face configurations, one face of which will approximate any known mating roof surface or corner. Throughout each mounting pad there is disposed a flexible rod supporting the load and distributing the load uniformly through the mounting pad to the underlying roof by flexibly conforming the mounting pad with the attendant roof curvature. The width adjustment of the carrier is achieved through a knob rotatable lead screw interconnecting two elements, telescopingly encased within a support or load bearing member of the carrier itself. Accordingly, the carrier may be readily manually adjusted to the appropriate width upon any vehicle roof by simply placing the carrier thereon and turning the knobs until the desired width is achieved. Nylon strap supported gutter engaging hooks retain the carrier upon the vehicle roof by operation of cam lock buckles, which buckles facilitate a certain amount of tightening of the strap and yet provide a quick release feature. Each strap is routed into operative engagement with an end of the flexible rod which rod has a predetermined freedom of lateral movement with respect to the carrier itself. The resulting interacting forces will back load the lead screws sufficiently to provide effective locking. Moreover, the geometry of the strap attachment in combination with the width adjustment capability is such that after initial tightening of the straps, rotation of the lead screws by the respective knobs will readily bring about further tightening of the straps without substantial width change of the load bearing supports; thereby, secure attachment of the carrier irrespective of the physical strength of the user is assured.

It is therefore a primary object of the present invention to provide apparatus for distributing uniformly across a supporting roof area the load imposed by a car top carrier.

Another object of the present invention is to provide a car top carrier useable with equal facility upon the roof of any known hardtop vehicle.

Yet another object of the present invention is to provide a car top carrier which is adjustable in width in situ.

Still another object of the present invention is to provide a car top carrier having width adjustable telescoping members which become back loaded and locked with respect to one another on securing of the carrier to the roof of a vehicle.

A further object of the present invention is to provide a tie down apparatus for car top carriers which translates the forces exerted by the mounting pads and the gutter hooks into a locking force acting upon width adjustment mechanisms.

A yet further object of the present invention is to provide opposed mounting pads extending continuously longitudinally and in conformance with the supporting roof lines underlying the lateral edges of a supported car top carrier.

A still further object of the present invention is to provide a mounting pad having one of a plurality of faces selectable to most closely conform with an underlying supporting roof curvature.

A still further object of the present invention is to provide an elongated mounting pad longitudinally conformable to an underlying supporting roof area to uniformly distribute a load therealong.

These and other objects of the present invention will become more apparent to those skilled in the art as the description thereof proceeds.

The present invention may be described with greater specificity and clarity with reference to the following drawings, in which:

FIG. 1 is an isometric view of the car top carrier;

FIG. 2 is a broken cross-sectional view taken along lines 2—2, as shown in FIG. 1; and FIG. 3 is a partial side view taken along lines 3—3, as shown in FIG. 2.

Referring to FIG. 1, there is shown a car top carrier 10 having castings 12 and 14 supporting mounting pad 16 and castings 18 and 20 supporting mounting pad 22. Tubing 24 and 26 is attached to and extends from castings 12 and 18, respectively, into opposed ends of tubular support 28. Similarly, tubing 30 and 32 is attached to and extends from castings 14 and 20, respectively, into opposed ends of tubular support 34. Each of strap and gutter hook means 36, 38, 40 and 42 extends from one of castings 12, 14, 18 or 20, respectively, to secure the car top carrier in place.

Each of mounting pads 16 and 18 includes differently contoured faces in order that one of the faces may be selected which most closely conforms with the supporting longitudinal roof line edge of the vehicle upon which the car top carrier is to be placed. The total surface area in contact with the roof may be 96 square inches, which area is sufficient to reduce the pressure exerted to a range of 2-3 pounds per square inch under normal load conditions. Such a loading removes any danger of roof denting. To insure that both mounting pads 16 and 22 are located upon the intended roof line, roof corner or surface area, the separation therebetween is adjustable by rotation of knobs 44 and 46. Each of the knobs is attached to a lead screw, which, upon rotation, varies the displacement between tubings 24, 26 or 30, 32 and hence the separation between the mounting pads. Preferably, the knobs are low torque knobs to prevent over tightening.

Referring to FIGS. 2 and 3, various details of the car top carrier structure will be described. Each of mounting pads 16 and 22 is triangular in cross-section to provide three faces, 48, 50 and 52. Face 48 includes two planar surfaces intersecting with one another to form a "V", which "V" may define an angle of 147°. Face 50 is of constant curvature having a small radius, nominally three inches while face 52 is also of constant curvature having a large radius, nominally five inches. It has been found by trial and error that one of faces 48, 50 or 52 will matingly conform with the longitudinal roof line above the doors of almost all known hardtop vehicles. To insure maximum surface conformation, the longitudinal edges of the faces are undercut by undercuts 54, 56 and 58. A material well suited for the mounting pads has been found to be 75 durometer grey ethylene propylene rubber as it offers exceptional qualities in weatherability, flexibility and aging. Furthermore, it provides good separation from automobiles under extremes of temperature and it will not scratch or stain a car paint surface.

To insure conformance of mounting pads 16 and 22 with the longitudinal curvature of the contacted roof line or area, each mounting pad is supported upon an internally placed flexible rod, such as rods 60, 62. The ends of the rods are supported within slots 64 in the respective pairs of castings and are maintained in place by end caps 66, 68 and 70 (see FIG. 1).

Strap 72 of strap and hook means 42 may be of the type known as type 25 nylon needle loom material of 1200 lb. tensile strength. It extends from gutter engaging hook 74 partially about rod 62 interior of legs 76, 78 of casings 14 (see FIG. 1) and through cam lock 80 of buckle 82. After engagement of hook 74 with gutter 84, pulling upon the free end of strap 72 will exert a force upon rod 62 to bring it to the lower end of slot 64. Locking of the strap when tight is effected by cam lock 80. Release of the strap from the cam lock is achieved by pressing upon and rotating arm 86 of the cam lock. To minimize damage of the finish on the gutter, the hook may be coated with 0.010 to 0.020 inches of soft vinyl known as Duravin.

The width adjustment apparatus for car top carrier 10 will be described with joint reference to FIGS. 1 and 2. Knob 46 is pinned to lead screw 90 rotatable supported and longitudinally stabilized with respect to castings 20 through thrust bushing 92 and spacer bushing 94. One or more supports for the lead screw may be employed within tubing 32. A nut 96 in threaded engagement with the lead screw is securely attached within tubing 30. One or more supports for the lead screw may be employed within tubing 30. Upon rotation of knob 46 with commensurate rotation of the lead screw, nut 96 and attached tubing 30 will be caused to travel therealong and result in a change in longitudinal displacement between tubings 30 and 32; thereby, the spacing intermediate castings 20 and 14 and the width of the car top carrier may be varied. After any change in displacement of the tubings, support 28 may be slid therealong until it is centered with respect to the interiorly extending tubings or it may be slid to one side or the other, depending upon the nature of the load to be carried. The lead screw includes rolled threads which work harden the lead screw for increased wear life. Moreover, the rolled thread may be coated with molycoat for lubrication and corrosion resistance purposes.

The operation of the car top carrier will now be described. Mounting pads 15 and 16 are rotated until one of faces 48, 50 or 52, whichever is closest in conformance with underlying roof area 100, is adjacent thereto. This is, if the underlying surface is sharp edged at the point of contact, surface 48 should be placed thereagainst; if the roof curvature is small radiused, surface 50 should be thereagainst; and, if the roof curvature is large radiused, surface 52 should be thereagainst. After placement of the car top carrier upon the roof, knobs 44 and 46 are rotated to extend or contract tubings 24, 26 and 30, 32 to locate the mounting pads at the respective points of contact upon the roof. The hooks of each of the strap and hook means 36, 38, 40 and 42 are brought into engagement with a respective gutter segment and the free ends of the straps are tightened to tie down the car top carrier upon the roof. Further tightening of the straps may be effected by rotating knobs 46 and 48 to contract tubing pairs 24, 26 and 30, 32. To disengage the car top carrier from the roof, arms 86 of cam lock 80 are pressed and the respective straps are immediately released to relieve engagement between a hook and its respective gutter segment. The car top carrier may then be removed.

By employing slots 64 to engagingly receive the ends of rods 60 and 62, various benefits result. The slots permit unequal tightening or displacement between the pairs of tubing without causing binding between the castings and the rods of the mounting pads. The fore and aft (longitudinal) curvature of the engaged roof surface usually varies substantially between a line parallel and close to the gutter and a line displaced closer to the roof center line. Should the car top carrier not be geometrically centered upon the car roof, this difference in curvature of the underlying roof surface contacted by the mounting pads might result in localized pressure concentrations along the mounting pads were some freedom of the ends of the pads with respect to the car top carrier not available.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A car top carrier for supporting a load upon the roof of a vehicle, said car top carrier comprising in combination:
   (a) at least a pair of elongated mounting pads for supporting said car top carrier upon the roof, each said mounting pad including:
      i. at least one face configured to be conformable with the lateral curvature of the underlying roof area and internally supporting said elongated mounting pads; and
      ii. a flexible rod resiliently conformable with the longitudinal curvature of the underlying roof area, whereby each said mounting pad is in mating contact with the underlying surface area and distributes any load imposed upon the mounting pad uniformly across the underlying roof area;
   (b) at least two sets of telescoping members for maintaining said pair of mounting pads at a selectable width and for supporting the load placed upon said car top carrier, each said set of telescoping members including means for adjusting the length of said set of telescoping members;
   (c) a casting disposed at each end of each set of said sets of telescoping members for engaging one end of one of said mounting means; and
   (d) hook and strap means extending from each of said castings for securing said car top carrier to the roof of the vehicle.

2. The car top carrier as set forth in claim 1 wherein each said mounting pad is triangular in cross-section and defines three faces.

3. The car top carrier as set forth in claim 2 wherein said rod is disposed within and extends through said mounting pad.

4. The car top carrier as set forth in claim 3 wherein said rod is rotatably mounted within and intermediate a pair of said castings to accommodate selection of one of said three faces for contact with the underlying roof area.

5. The car top carrier as set forth in claim 4 wherein each said casting includes a slot for receiving an end of one of said rods to accommodate limited movement of said rod therewithin.

6. The car top carrier as set forth in claim 4 wherein the surface of each face of said three faces is of a contour different from that of the other faces.

7. The car top carrier as set forth in claim 6 wherein each set of said sets of telescoping members includes a lead screw and a knob for extending and contracting said set of telescoping members upon rotation of said knob.

8. The car top carrier as set forth in claim 7 wherein said hook and strap means includes a cam lock buckle for locking said hook and strap means.

9. The car top carrier as set forth in claim 8 wherein each said casting includes means for engaging said rod end within said casting with the strap of said strap and hook means.

10. The car top carrier as set forth in claim 9 wherein each set of said sets of telescoping members includes a first tubing and a second tubing interconnected by said lead screw and a support circumscribingly mounted upon said first and second tubing for supporting the load placed on said car top carrier.

11. An elongated mounting pad for supporting the structure of a car top carrier, said mounting pad comprising in combination:
   (a) three differently configured faces, each said face extending along said mounting pad and being configured conformable with a range of lateral curvature of the underlying surface upon which it is to be placed;
   (b) a rod resiliently conformable with the longitudinal curvature of the underlying surface for distributing loads imposed upon said mounting pad uniformly across the underlying surface and internally supporting said elongated mounting pads; and
   (c) means for rotatably securing said mounting pad to the car top carrier to permit rotation of said mounting pad to bring the face of said three faces most closely conforming with the underlying surface area into contact therewith.

12. The mounting pad as set forth in claim 11 wherein said rod extends through the interior of said mounting pad and protrudes from either end thereof.

13. The mounting pad as set forth in claim 12 wherein said securing means engages the ends of said rod protruding from said mounting pad.

14. The mounting pad as set forth in claim 12 wherein said mounting pad is of 75 durometer grey ethylene propylene rubber material.

15. The mounting pad as set forth in claim 11 wherein the cross-section of a first face is "V" shaped, the cross-section of a second face has a radius of curvature not greater than three inches and the cross-section of a third face has a radius of curvature not less than three inches.

16. The mounting pad as set forth in claim 11 wherein the edges defining elongated sides of each of said three faces are undercut to facilitate conformance of the respective face with the underlying surface.

* * * * *